United States Patent
Christner et al.

(10) Patent No.: US 10,129,621 B2
(45) Date of Patent: Nov. 13, 2018

(54) CONNECTION DEVICE FOR LOUDSPEAKER BOXES, ARRANGEMENT OF LOUDSPEAKER BOXES SUSPENDED BELOW ONE ANOTHER, AND METHOD AND TRANSPORT CART FOR SETTING UP THE ARRANGEMENT

(71) Applicant: d&b audiotechnik GmbH, Backnang (DE)

(72) Inventors: Matthias Christner, Ludwigsburg (DE); Michael Eckstein, Backnang (DE)

(73) Assignee: D&B AUDIOTECHNIK GMBH, Backnang (DE)

( * ) Notice: Subject to any disclaimer, the term of this patent is extended or adjusted under 35 U.S.C. 154(b) by 38 days.

(21) Appl. No.: 15/375,639

(22) Filed: Dec. 12, 2016

(65) Prior Publication Data
US 2017/0171650 A1   Jun. 15, 2017

(30) Foreign Application Priority Data

Dec. 10, 2015   (DE) .................. 10 2015 121 519

(51) Int. Cl.
*H04R 1/02* (2006.01)
*H04R 1/40* (2006.01)
(Continued)

(52) U.S. Cl.
CPC .............. *H04R 1/026* (2013.01); *B62B 3/02* (2013.01); *B62B 5/0093* (2013.01);
(Continued)

(58) Field of Classification Search
CPC ... H04R 1/026; H04R 1/403; H04R 2201/403
(Continued)

(56) References Cited

U.S. PATENT DOCUMENTS

| | | | |
|---|---|---|---|
| 5,819,959 A * | 10/1998 | Martin | H04R 1/026 211/118 |
| 6,536,554 B2 * | 3/2003 | Andrews | H04R 1/026 181/144 |

(Continued)

FOREIGN PATENT DOCUMENTS

GB   2202710 A   9/1988

OTHER PUBLICATIONS

Cohedra Manual 3.1, http://87.106.71.220/oma/hk/manual/1666_co_coco_BDA_engl.pdf, Retrieved on Dec. 12, 2016, pp. 1-30.

*Primary Examiner* — Jeremy Luks
(74) *Attorney, Agent, or Firm* — Cooper Legal Group, LLC (57) ABSTRACT

A connection device for setting up an arrangement of a plurality of loudspeaker boxes that are suspended beneath one another comprises a first assembly rail which is provided for assembly on a first loudspeaker box and to which a latching part is attached, and a second assembly rail which is provided for assembly on a second loudspeaker box and to which a retaining element that interacts with the latching part is attached. Herein, a free path length of a longitudinal displaceability of the latching part in relation to the first assembly rail is preselectable. Furthermore, the position of the retaining element in relation to the second assembly rail is preselectable.

16 Claims, 9 Drawing Sheets

(51) Int. Cl.
- *B62B 3/02* (2006.01)
- *F16M 13/02* (2006.01)
- *H04R 27/00* (2006.01)
- *B62B 5/00* (2006.01)
- *F16B 45/00* (2006.01)
- *F16B 7/22* (2006.01)

(52) U.S. Cl.
CPC .......... *F16M 13/022* (2013.01); *H04R 1/403* (2013.01); *H04R 27/00* (2013.01); *B62B 2202/12* (2013.01); *F16B 7/22* (2013.01); *F16B 45/00* (2013.01); *H04R 2201/403* (2013.01)

(58) Field of Classification Search
USPC .................................................. 181/30, 199
See application file for complete search history.

(56) References Cited

U.S. PATENT DOCUMENTS

| | | | | |
|---|---|---|---|---|
| 6,640,924 B2 * | 11/2003 | Messner | ............... | H04R 1/026 |
| | | | | 181/144 |
| 7,693,296 B2 * | 4/2010 | Monitto | ............... | H04R 1/028 |
| | | | | 381/334 |
| 8,170,263 B2 * | 5/2012 | Engebretson | ......... | H04R 1/026 |
| | | | | 381/335 |
| 9,124,969 B2 * | 9/2015 | McGhee | ............... | H04R 1/026 |
| 2007/0000719 A1 | 1/2007 | Bothe | | |
| 2012/0093347 A1 | 4/2012 | Adamson et al. | | |

* cited by examiner

CONNECTION DEVICE FOR LOUDSPEAKER BOXES, ARRANGEMENT OF LOUDSPEAKER BOXES SUSPENDED BELOW ONE ANOTHER, AND METHOD AND TRANSPORT CART FOR SETTING UP THE ARRANGEMENT

RELATED APPLICATION

This application claims priority to German Patent Application 10 2015 121 519.5, filed on Dec. 10, 2015, and which is incorporated herein by reference.

TECHNICAL FIELD

Embodiments described herein generally relate to a connection device for setting up an arrangement of a plurality of loudspeaker boxes that are suspended beneath one another, to an arrangement of a plurality of loudspeaker boxes that are suspended beneath one another, to a method for setting up an arrangement of a plurality of loudspeaker boxes that are suspended beneath one another, and to a transport cart for the transportation of loudspeaker boxes that lie on top of one another.

BACKGROUND

Loudspeaker assemblies which are set up from loudspeaker boxes that are suspended beneath one another are employed for the acoustic irradiation of comparatively large audience sectors in closed spaces or in open spaces. These loudspeaker assemblies are also referred to a line arrays. The overall arrangement is usually suspended on a so-called fly frame (or rigging frame), elevated by way of a mechanism, and suitably aligned. Herein, a suitable shape or curvature, respectively, of the line array has to be established for an optimal acoustic irradiation of a given geometry of an acoustic area. In order for a closed frontage of the line array, which is advantageous for acoustic reasons, to be maintained, the housings of the loudspeaker boxes are embodied so as to be trapezoidal and, on the front side thereof, are fixedly connected so as to be rotatable. This enables the desired angles between the housings to be set by way of length-adjustable connection devices on the rear sides of the housings.

The length-adjustable connection device has to ensure reliable connection of the individual housings in the case of the high stresses that arise, on the one hand, and enable variability of the setting of the intermediate angle in a simple manner, on the other hand. Moreover, short assembly and disassembly times are of significant relevance to the setting-up and taking-down works of loudspeaker-box assemblies of this type, in particular in the case of the loudspeaker-box assemblies being so-called touring systems which often have to be set up and torn down again for only a single large event. Last but not least, the connection system should be cost effective and meet the high safety standards, wherein heavy lifting works are to be avoided as far as possible in particular when setting up and taking down, and/or the risk of accidents is to be kept as low as possible.

BRIEF DESCRIPTION OF DRAWINGS

Embodiments will be explained in more detail hereunder by means of exemplary embodiments with reference to the drawings.

DESCRIPTION OF EMBODIMENTS

Two fundamentally different approaches to setting up or taking down, respectively, loudspeaker-box assemblies of this type (line arrays, for example) are available. A first setting-up method is based on successively connecting individual loudspeakers or loudspeaker groups from below to the partially set-up loudspeaker-box arrangement, wherein the desired intermediate angle between the individual loudspeaker boxes is set already during suspending. In the case of a second setting-up method, loudspeaker boxes or loudspeaker-box groups are likewise connected from below to the partially set-up arrangement, wherein setting of the desired intermediate angle however is carried out only upon completion of the entire arrangement in the suspended state by a way of an additional compression strand that runs on the rear side of the loudspeaker boxes.

Both setting-up methods have advantages and disadvantages that depend inter alia on the number of loudspeaker boxes, the weight of the latter, the various length-adjustable connection devices that are required for the respective method, and further deployment conditions (for example, the education level of the workers pertaining to the various connection devices and setting-up methods that is important with a view to the prevention of accidents and the setting-up time).

Transport carts are employed for the transportation of the loudspeakers to the individual locations of the loudspeaker-box assemblies. Said transport carts have a bearing face on which the loudspeaker boxes are placed individually or in groups. During setting up of the loudspeaker-box arrangement, the transport carts loaded with the individual loudspeakers or loudspeaker-box groups are pushed under the partially completed loudspeaker-box arrangement so as to successively suspend or latch the individual loudspeaker boxes or loudspeaker-box groups that are placed on the transport cart from below to the loudspeaker-box arrangement to be set up.

It may be desirable to achieve a connection device for setting up an arrangement of a plurality of loudspeaker boxes that are suspended beneath one another, which connection device allows simple, time-saving and at the same time safe assembly/disassembly of the arrangement (line array, for example) under the most varied conditions. The invention is furthermore targeted toward stating a method for setting up an arrangement of a plurality of loudspeaker boxes that are suspended beneath one another that meets the abovementioned requirements. The invention is furthermore targeted toward achieving a transport cart for the transportation of a group of loudspeaker boxes that lie on top of one another, which transport cart in practical use is flexibly employable.

Accordingly, one embodiment of a connection device for setting up an arrangement of a plurality of loudspeaker boxes that are suspended beneath one another may comprise a first assembly rail which is provided for assembly on a first loudspeaker box and to which a latching part (e.g. snap-fit part) is attached, and a second assembly rail which is provided for assembly on a second loudspeaker box and to which a retaining element that interacts with the latching part is attached. Herein, a free path length of a longitudinal displaceability of the latching part in relation to the first assembly rail is preselectable, and the position of the retaining element in relation to the second assembly rail is preselectable.

By way of this multiple settability of the connection device it is achieved that dissimilar setting-up methods may be carried out using one and the same connection device. While the preselectability of the free path length of the longitudinal displaceability of the latching part enables the target angle to be predefined for setting up the loudspeaker arrangement according to the so-called compression method, the preselectability of the position of the retaining element on the respective closest loudspeaker box achieves the possibility of the intermediate angle of the loudspeaker boxes to be set in a targeted manner during the setting up of the loudspeaker-box arrangement according to the so-called tension method. The connection device thus enables the choice of a plurality of suitable setting-up methods, on account of which the time for setting up and taking down the loudspeaker-box arrangement, respectively, may be shortened, and the risk of accidents may be reduced. Moreover, the special deployment conditions (the number, the weight, the desired curvature of the loudspeaker-box arrangement, and the education level or the experience of the workers, for example) may be significantly better taken into account.

The term "intermediate angle between two loudspeaker boxes" is used to refer to the differential angle of the main radiation planes between the two loudspeaker boxes. That is to say that the intermediate angle between the two loudspeaker boxes in the case of loudspeaker boxes having parallel frontages is substantially zero degrees. In the case of loudspeaker boxes having a trapezoidal housing and which bear on one another, the intermediate angle corresponds to the trapezoidal angle (for example between 5 and 9 degrees, for example 7 degrees) of the housings. The (maximum) setting range may thus be between zero degrees and the trapezoidal angle of the housings.

The latching connection that is configured by the latching part and the retaining element interacting with the latching part may enable that the connection is formed in a self-acting manner as a result of the latching. The latching interlock may be implemented without difficulty both under stress (that is to say in the case of assembling loudspeaker boxes on an already suspended system) as well as in a stress-free manner. However, it may also be provided that the latching interlock does not automatically result when the latching part and the retaining element converge, but has to be accomplished by additional manual handling.

The connection device may be configured such that in the case of first and second assembly rails, respectively, that are assembled in a locationally fixed manner on the first and second loudspeaker boxes, the two loudspeaker boxes, by preselection of the position of the retaining element, or by preselection of the free path length of the longitudinal displaceability, are interlockable at a preadjustable angle, specifically the target angle that is predefinable by the respective preselection.

The latching part may have, for example, an elongate bore through which an assembly-rail bolt that is fixable to the first assembly rail protrudes. Alternatively or additionally, the first assembly rail may have an elongate bore through which a latching part bolt that is fastened to the latching part protrudes. Longitudinal displaceability of the latching part in relation to the first assembly rail is caused in both cases.

The latching part on an end that faces the second assembly rail may have a latching hook for example. In this case, the latching hook engages with or interlocks to the retaining element in the preselected position in relation to the second assembly rail. The retaining element may, for example, be a locking bolt that is insertable into bores of a grid of bores, wherein the grid of bores may be configured in a profiled element of the second assembly rail.

The latching part may be fastened to the first assembly rail by means of a pivot joint. However, it is also possible for the latching part to be fastened to the first assembly rail in a longitudinally displaceable yet pivotably fixed manner, and to either latching to the second assembly rail in a self-acting manner upon engagement with the retaining element, or to have to be manually brought to engage with the retaining element in an interlocking manner.

The free path length of the longitudinal displaceability of the latching part may be settable by way of a stop, the position of the latter in relation to the second assembly rail being preselectable. On account thereof, the free path length of the longitudinal displaceability may be limited, and may also be reduced to the value of 0, for example. This is particularly relevant to setting up the loudspeaker arrangement according to the compression method, since in this case the free path length of the longitudinal displaceability may determine the target angle (intermediate angle between the first and the second loudspeaker box in the completed state). Moreover, by setting the free path length of the longitudinal displaceability to a reduced dimension, for example to the value of 0, a stacked arrangement of the first and the second loudspeaker box may be achieved in the upright state in which the first loudspeaker box and the second loudspeaker box are disposed in a vertical alignment on top of one another.

This means that in the case of embodiments in which the latching part or the first assembly rail has an elongate bore, the maximum possible free path length of the longitudinal displaceability may be predefined by the length of the elongate bore. The stop then enables the (actual) free path length of the longitudinal displaceability to be set, wherein this setting may be modified during assembly (setting up) and/or during disassembly (taking down) of the loudspeaker-box arrangement. As will yet be described in more detail hereunder, the free path length of the longitudinal displaceability in the case of stacked loudspeaker boxes may be very minor, for example, or be zero, while the free path length of the longitudinal displaceability in the suspended state of the loudspeaker-box arrangement may be preselected to the desired target value, and is later set to the desired target value by compressing the loudspeaker-box arrangement.

An arrangement of a plurality of loudspeaker boxes that are suspended beneath one another comprises at least two loudspeaker boxes that are disposed beneath one another and that in the front region are interconnected by way of an articulated connection and that on the rear side are connected by way of at least one connection device according to one or a plurality of the embodiments described herein.

The connection device herein may be configured so as to predefine the angle of the two loudspeaker boxes that are disposed beneath one another in the suspended state by preselection of the position of the retaining element in relation to the second assembly rail. This may be performed, for example, during setting up of the loudspeaker-box arrangement according to the tension method.

It is likewise possible for the connection device to be configured so as to predefine the angle of the two loudspeaker boxes that are disposed beneath one another in the suspended state by preselection of the free path length in relation to the first assembly rail. Predefining this target angle by preselection of the free path length of the longitudinal displaceability may be expedient for setting up the loudspeaker-box arrangement according to the compression method, for example.

One embodiment of a method for setting up an arrangement of a plurality of loudspeaker boxes that are suspended beneath one another according to the tension method may comprise the following steps: preassembling a first group of loudspeaker boxes, having the first loudspeaker box as the topmost loudspeaker box and the second loudspeaker box as the loudspeaker box that lies therebelow, by connecting the two loudspeaker boxes at the articulated connections, wherein the first and the second loudspeaker boxes bear on one another; suspend suspending the first loudspeaker box of the first group of loudspeaker boxes to a fly frame or to a lowermost loudspeaker box of a partially set-up arrangement; and lifting the first group of loudspeaker boxes, wherein an intermediate angle that is predefined by the position of the retaining element is established between the first and the second loudspeaker boxes.

Upon setting up the arrangement according to the just described embodiment, the intermediate angle (that is predefined by the position of the retaining element, may be secured by mechanically fixing the latching part to the second assembly rail. Securing prevents unintentional releasing of the latching connection.

For example, upon lifting the first group of loudspeaker boxes, a second group of loudspeaker boxes may be suspended to the lowermost loudspeaker box of the first group of loudspeaker boxes. Prior to latching, the second group of loudspeaker boxes may be preassembled in the exact same manner as the first group of loudspeaker boxes, and the positions of the retaining elements may likewise be previously preselected as desired.

One further embodiment of a method for setting up an arrangement of a plurality of loudspeaker boxes that are suspended beneath one another comprises the following steps: preassembling a first group of loudspeaker boxes, having the first loudspeaker box as the topmost loudspeaker box and the second loudspeaker box as the loudspeaker box that lies therebelow, by connecting the two loudspeaker boxes at the articulated connections, wherein an intermediate angle of zero, for example, between the first loudspeaker box and the second loudspeaker box is preselected by way of a stop of the latching part on the first assembly rail; suspending the first loudspeaker box of the first group of loudspeaker boxes to a fly frame or to a lowermost loudspeaker box of a partially set-up arrangement; repositioning the stop in relation to the first assembly rail; and lifting the first group of loudspeaker boxes, wherein an intermediate angle, that is to say the target angle, that is predefined by the new position of the stop is set.

Decompression of the stop, for example by lifting the first group of loudspeaker boxes, may be performed upon suspending. Since the loudspeaker boxes of the first group subsequently are already in the suspended state or at least in a state in which the former are held under tension, the stop is not stressed and may therefore be repositioned in a simple manner. The desired target angle between the first loudspeaker box and the second loudspeaker box is preselected by repositioning the stop. Repositioning of the stop may be performed at any point in time after decompression, for example prior to, during, or after lifting the loudspeakers of the first group.

For example, upon lifting the first group of loudspeaker boxes, a second group of loudspeaker boxes may be suspended to the lowermost loudspeaker box of the first group of loudspeaker boxes in an analogous manner. Prior to suspending, the second group of loudspeaker boxes may be preassembled in the exact same manner as the first group of loudspeaker boxes, and repositioning of the stops to the desired stop position may likewise be performed in the lifted state or at least under tension.

Compressing may be performed, for example, by way of a compression hoist that runs on the rear side of the arrangement and that is operable from the base surface, for example. Compressing is usually performed only once all groups of loudspeaker boxes have been suspended.

One embodiment of a transport cart for the transportation of a group of loudspeaker boxes that lie on top of one another has a bearing face that is adjustable in terms of inclination, and an inclination-adjustment mechanism by way of which the inclination of the bearing face is presettable. Such a transport cart enables or facilitates setting up and taking down an arrangement of a plurality of loudspeaker boxes that are suspended beneath one another, both according to the tension method as well as according to the compression method. Since the loudspeaker boxes in the case of the tension method are typically transported in the collapsed state, that is to say so as to bear on one another, on the transport cart, while during setting up of the loudspeaker-box arrangement according to the compression method the loudspeaker boxes are typically stacked in a vertical alignment on the transport cart, inclination adjustability of the bearing face by way of the inclination-adjustment mechanism enables the group of loudspeaker boxes (that is to say the stack of loudspeaker boxes that lies on the transport cart) to be aligned such that said stack is optimally aligned for the respective setting-up method.

To this end, it may be provided that the inclination-adjustment mechanism for setting the inclination of the bearing face is configured so as to have discrete steps. For example, a first inclination step may be adapted to a payload of the bearing face having a group of loudspeaker boxes that bear on one another and are thus disposed on top of one another in a curved extent, while a second inclination step is adapted to a payload of the bearing face having a group of loudspeaker boxes that are disposed on top of one another in substantially vertical alignment (that is to say having intermediate angles of approximately zero).

According to FIG. 1, a linear loudspeaker-box arrangement, in the following represented in an exemplary manner, without any limitation to the generality, by a line array 1, comprises a plurality of loudspeaker boxes 2 that are suspended beneath one another. The loudspeaker boxes 2 may be suspended on a fly frame 5. The loudspeaker boxes 2 in the front region may be directly mutually adjacent, that is to say form a substantially compact frontage. To this end, the loudspeaker boxes 2 in the front region may be interconnected in a mutually pivotable manner by way of an articulated connection 3. For example, steel-sheet strips 30 which each extend laterally so as to be adjacent to the front side (irradiation region 31) of the loudspeaker box 2 across the height of the loudspeaker box 2 may be provided. The pairs of steel-sheet strips 30 each may frame one housing side wall 36 of the loudspeaker box 2, and may be fixedly connected to the latter. The articulated connections 3 may comprise bearing bolts, for example, which are push-fitted through bearing eyelets on the pairs of steel-sheet strips 30, enabling an articulated mechanical fastening of adjacent loudspeaker boxes in the front region thereof.

The loudspeaker boxes 2 may have a trapezoidal or a rearwardly tapered shaping, respectively. On account thereof, it is achieved that the loudspeaker boxes 2 are mutually disposable at dissimilar angular positions. In particular, the shaping of the loudspeaker boxes 2 that tapers off toward the rear region enables variable intermediate angles to be set between the individual loudspeaker boxes 2. FIG. 1 highlights the latter by way of a typical example in which the line array 1 in the lower region has a more intense curvature or bend than in the upper region. To this extent, the intermediate angles between adjacent loudspeaker boxes 2 in the upper region are smaller than in the lower region where the intermediate angle in the extreme case (that is to say when the loudspeaker boxes 2 bear on one another) may be increased up to the trapezoidal angle of the housing. The trapezoidal angle is that angle that is enclosed by the housing upper side wall and the housing lower side wall. The shaping of the loudspeaker box 2, in particular the trapezoidal angle, therefore limits the maximum curvature of the line array 1. The line array 1 at least in portions, or else across the entire length thereof, may be composed of identical loudspeaker boxes 2 (having in particular identical trapezoidal angles and/or identical main irradiation planes).

Figure 2:
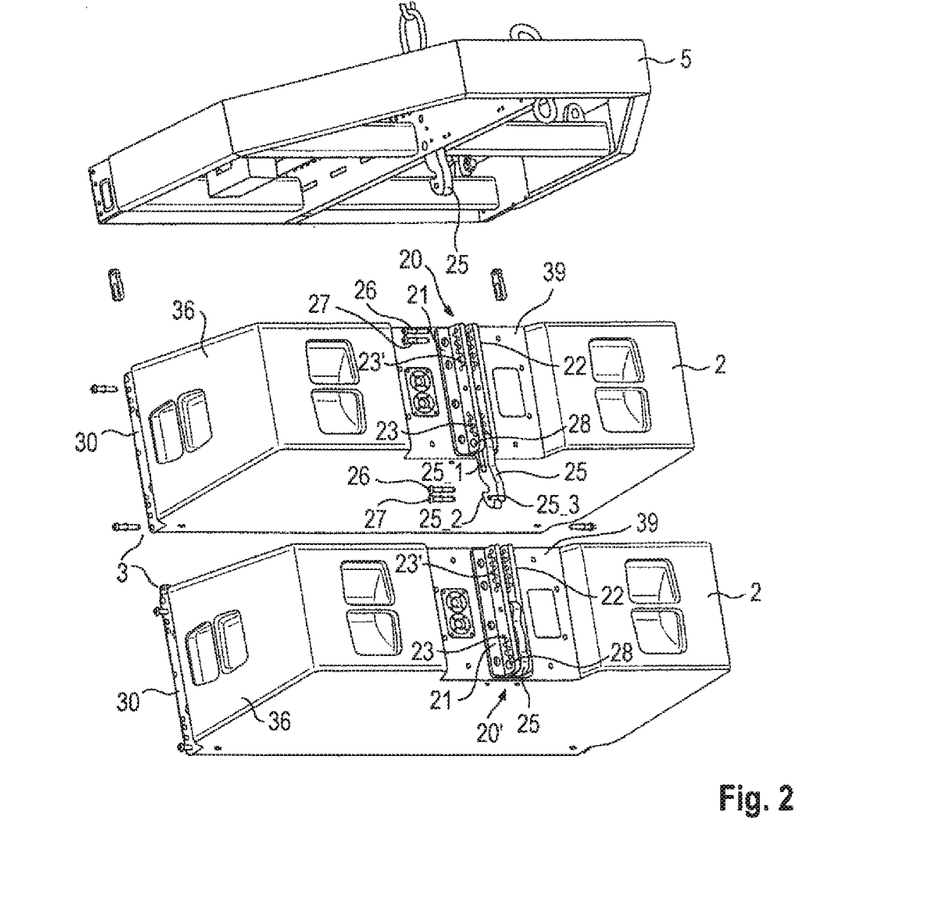
FIG. 2 is an exploded view of the fly frame and of two loudspeaker boxes from the rear.

According to FIG. 2, the upper loudspeaker box 2 on the rear side 39 thereof has a highly stable first assembly rail 20 having a wide base plate 21 and a profiled element 22. The base plate 21 is fixedly anchored to the rear wall 39 of the loudspeaker box 2. The profiled element 22 may be configured as a U-shaped double web, for example. A latching part 25 may be attached to the profiled element 22 of the first assembly rail 20, for example. The latching part 25 may be fastened to the profiled element 22 in the lower region of the latter. As will yet be explained in more detail hereunder, the latching part 25 may be fastened to the first assembly rail 20, for example to the double web 22 of the assembly rail 20) in a longitudinally displaceable manner. For this purpose, it may be provided either that the latching part 25 has an elongate bore 25_1 through which an assembly-rail bolt 28 that is fixable to the first assembly rail 20, or that the first assembly rail 20 protrudes (or the profiled element 22 thereof) is provided (in a manner not illustrated) with an elongate bore through which a latching part bolt (not illustrated, being functionally equivalent to the assembly-rail bolt 28) that is fastened to the latching part 25 protrudes.

In the example illustrated herein, the assembly-rail bolt 28 serves for the pivotable mounting of the latching part 25 on the first assembly rail 20. The latching part 25 may be pivotable about approximately 180°, for example, so as to be moved to a transportation position (see FIG. 2, lowermost loudspeaker box 2). The latching part 25 in the downwardly pivoted latching position thereof (see FIG. 2, upper loudspeaker box 2) protrudes beyond the lower side of the loudspeaker box 2.

The first assembly rail 20 may have a first double-bore grid 23, for example, which may be provided in the profiled element 22 of the first assembly rail 20, for example. The first double-bore grid 23 may be composed of two or more rows of bores, wherein the intermediate spacing between the bores may also be chosen such that the required stability of the profiled element 22 may be guaranteed, on the one hand, and sufficiently fine settability of the position of a stop for the latching part 25 on the first assembly rail 20 is enabled, on the other hand.

That is to say that the first double-bore grid 23 enables a stop for the latching part 25 in relation to the longitudinal displaceability thereof in relation to the first assembly rail 20 to be predefined. This will yet be explained in more detail later by means of figures to follow (see FIG. 7B, for example). It is to be pointed out that the elongate bore 25_1 in the latching part 25, and/or the first double-bore grid 23 on the first assembly rail 20, are to be understood as exemplary constructions, and that the mentioned functional features in constructive terms may also be implemented in another way.

The location of the assembly-rail bolt 28 on the first assembly rail 20 is typically fixed. Optionally, the first double-bore grid 23 (or another grid of bores) may also enable the assembly-rail bolt 28 that establishes the location or the pivot point, respectively, of the latching part 25 to be set at various positions in relation to the first assembly rail 20.

The lower loudspeaker box 2 on the rear side 39 thereof may have a highly stable second assembly rail 20' which is equipped with a wide base plate 21 and a profiled element 22. The base plate 21 is fixedly anchored on the rear wall 39 of the loudspeaker box 2. The profiled element 22 may be configured as a U-shaped double web, for example. A second double-bore grid 23' may be configured in the upper region of the profiled element 22 of the second assembly rail 20'. The second double-bore grid 23' may likewise have two or more rows of bores, wherein the intermediate spacing between the bores may be chosen such that the required stability of the profiled element 22 may be guaranteed, on the one hand, and sufficiently fine adjustability of the intermediate angle α between adjacent loudspeaker boxes 2 is enabled, on the other hand.

Figures 3A, 3B, 3C:
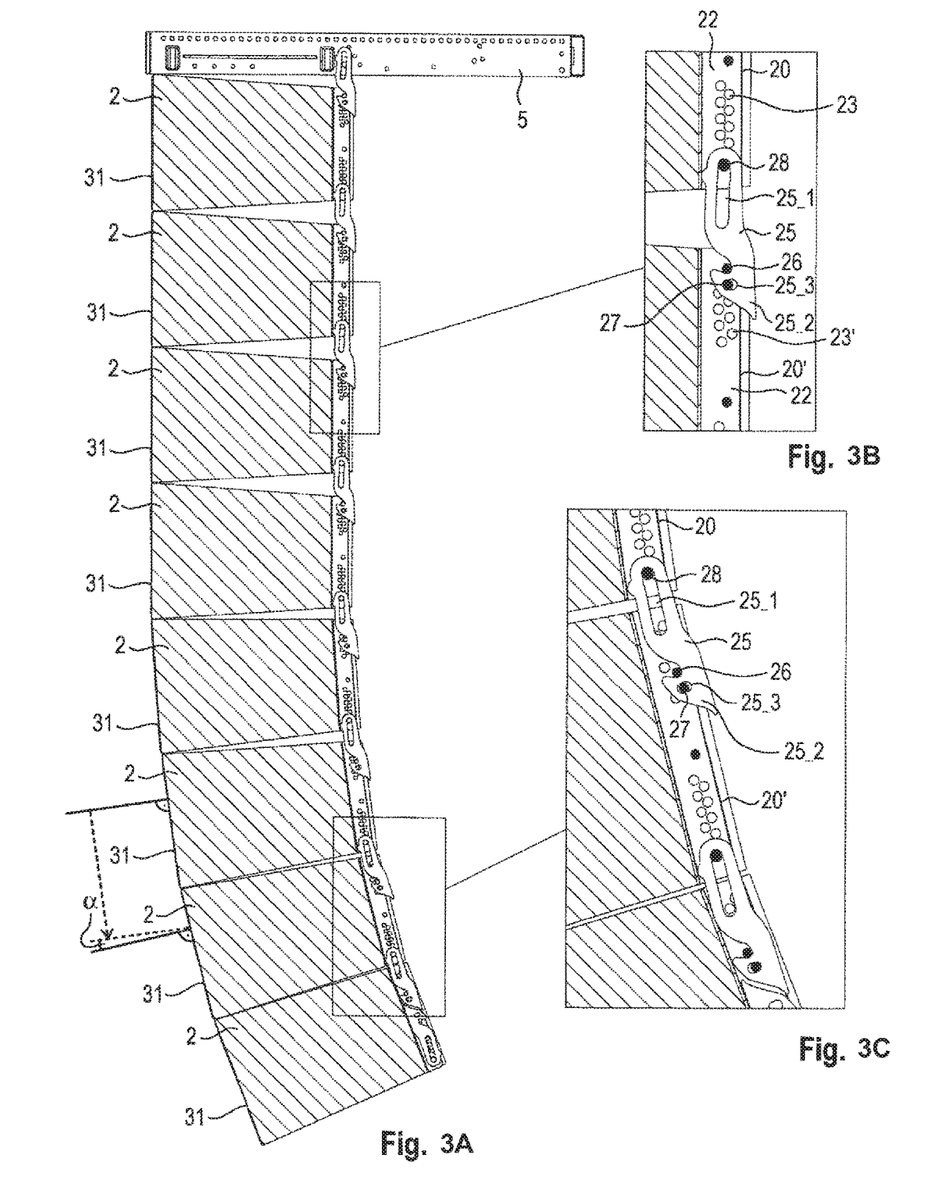
FIG. 3A is a cross-sectional illustration of the line array as shown in FIG. 1, having an interlocked and secured connection device in the suspended state.
FIG. 3B is a portion of FIG. 3A in the region of a connection device in the upper part of the line array.
FIG. 3C is a portion of FIG. 3A in the region of a connection device in the lower part of the line array.

FIGS. 3B and 3C show the setting of dissimilar effective lengths of the rear connection between adjacent loudspeaker boxes 2, on account of which dissimilar intermediate angles α between respective adjacent loudspeaker boxes 2 are obtained. As can be seen in FIGS. 3B and 3C, the desired intermediate angles α are set by prepositioning a retaining element on the second assembly rail 20', in the example illustrated by inserting the locking bolt 26 in respective suitable bores of the second double-bore grid 23'. The main irradiation planes of the individual loudspeaker boxes 2 in terms of the loudspeaker boxes 2 are identical and may run perpendicularly to the loudspeaker frontages (irradiation regions 31), as is the case in the example shown here.

For example, the latching part 25 at the free end thereof may be configured as an engagement or latching hook 25_2. Herein, the latching hook 25_2 in the interlocked position thereof encompasses the retaining element (for example the locking bolt 26) that is attached to the second assembly rail 20'.

The location of the latching parts 25 on the respective upper (first) loudspeaker boxes 2, or on the first assembly rails 20, respectively, may be identical, that is to say that the assembly-rail bolt 28 may in each case be guided through the same bore on the first assembly rails 20 (or on the profiled elements 22 of the first assembly rails 20, respectively).

The elongate bore 25_1 of the latching part 25 (or, in more general terms, the longitudinal displaceability of the latter) is not (yet) required for setting the desired intermediate angles α. The first double-bore grid 23 (or, in more general terms, the preselectability of dissimilar path lengths of the free displaceability of the latching part 25 on the first assembly rail 20) is not required for setting up the line array 1 as shown in FIGS. 3A, 3B, 3C.

A securing bolt 27 which is pushed through a further pair of bores in the second double-bore grid 23' of the second assembly rail 20', and through a bore 25_3 provided therefor in the that region of the latching part 25 that is remote from the bearing (for example in the latching hook 25_2) and securely locks the latching connection may be provided for preventing the latching connection from being released. By way of the securing bolt 27 it is also achieved that the latching connection is not only able to absorb and transmit tensile forces but also (high) thrust forces.

It is to be pointed out that the configuration of the latching part 25 as a pivotable latching hook is optional, that is to say that latching parts 25 that are not pivotable but merely displaceable in a linear manner are also possible, for example. The for example self-acting latching may then be performed in that the latching part 25 is pushed forward to a latching position that is caused by the retaining element. The latching part 25 herein need not be embodied having a latching hook 25_2 (as in the present example). Furthermore, the retaining element need not be implemented as a locking bolt 26 (as in the present example), but the former may be embodied in many other ways. In particular, the latching (interlocking) also does not have to occur in a self-acting manner, that is to say that it may be provided that the latching (interlocking) is accomplished by manual activation after the latching part 25 has been pushed forward, for example in that the retaining element is blocked or interlocked, respectively, to the latching part 25 (for example a rotary lock, latch, etc.) by a suitable mechanism.

It is to be pointed out that the first assembly rail 20 and the second assembly rail 20' may be of identical construction (see the figures) such that the longitudinally displaceable latching part 25 as well as the retaining element (for example the locking bolt 26) are attached to each assembly rail 20 (or 20', respectively). However, the first and the second assembly rail 20, 20' may also be embodied as separate parts. In this case, each loudspeaker box 2 (except, optionally, for the lowermost one in the line array 1) may be equipped both with a first assembly rail 20 as well as with a second assembly rail 20'. The combined/integral variant is illustrated in all figures, without any limitation of the generality.

Figure 1:
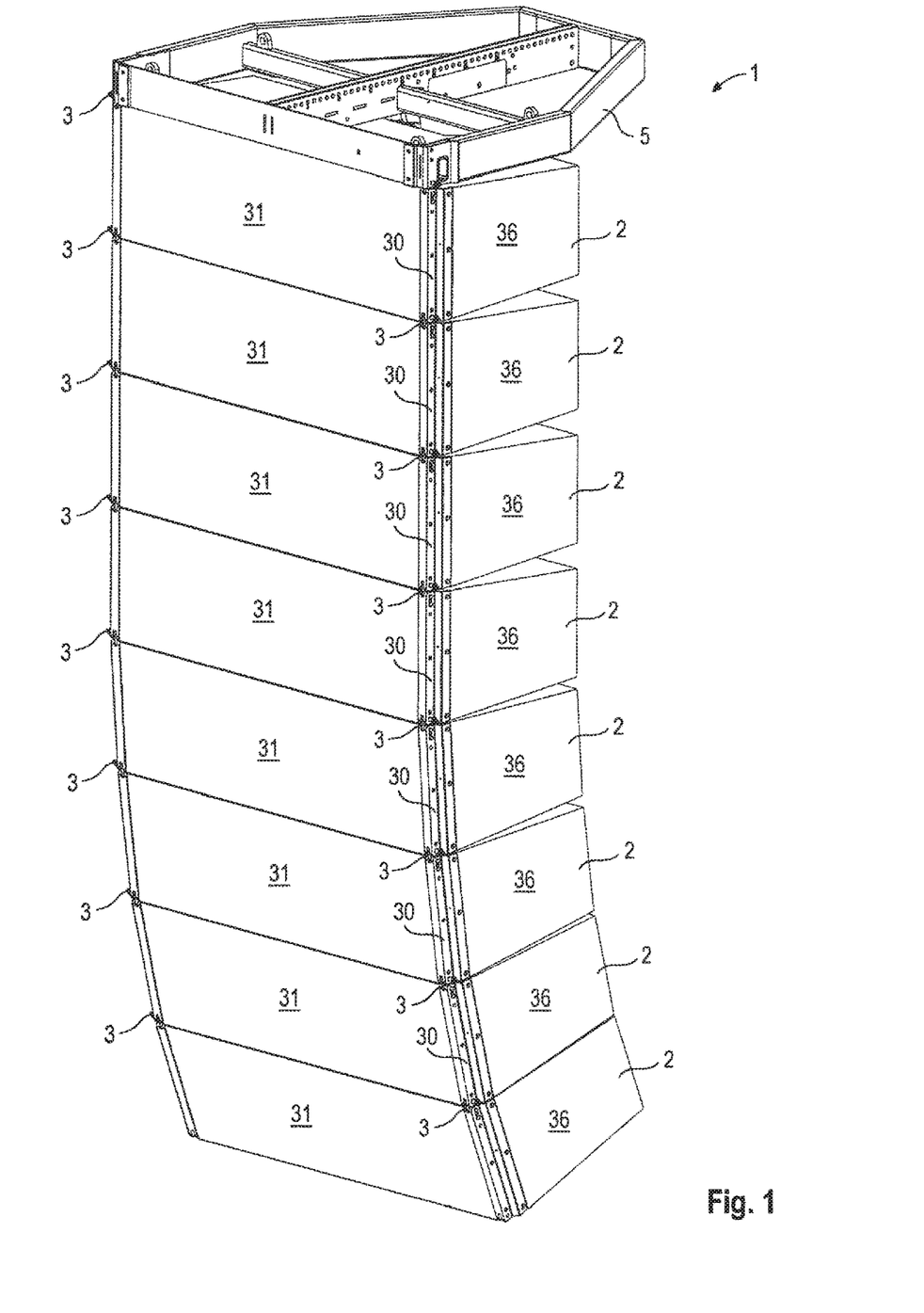
FIG. 1 is a perspective view of a line array having a fly frame and loudspeaker boxes that are suspended to the latter.

The line array 1 shown in FIGS. 1 and 3A is set up and taken down according to the so-called tension method. The tension method allows at least two dissimilar setting-up/taking-down variants.

Tension Method—Setting-Up/Taking-Down Variant 1

According to the setting-up and taking-down variant that hereunder is referred to the caterpillar method, each loudspeaker box 2 stands individually on one roller board (not illustrated) which in each case is assembled on the frontage (irradiation region 31) of the loudspeaker box 2. The frontages of the loudspeaker boxes 2 are interconnected by way of the articulated connections 3.

Thereafter, the desired intermediate angles α are preselected in that the angle-determining retaining element is moved to the desired position thereof on the second assembly rail 20' (in the example illustrated here, this is performed in that the angle-determining lock bolt 26 is inserted through the desired bore in the profiled element 22 of the second assembly rail 20').

The latching part 25 is thereupon prepared for the automatic latching, for example in that the latching part 25 that is configured as a latching hook 25_2 is folded out from the transportation position in the direction toward the adjacent loudspeaker box 2.

Thereupon, the fly frame 5 is attached to the first loudspeaker box 2, and is lifted using a chain hoist, for example. During lifting the adjacent rear edges of the loudspeaker boxes 2 fold together, wherein the latching part 25 automatically latches or engages to the retaining element (in the example used herein, the latching hook 25_2 jumps across the locking bolt 26).

Interlocking of the latching part 25 to the retaining element may be carried out either automatically or manually. It may be provided, for example, that the latching connection automatically latches or engages in the course of the loudspeaker boxes 2 being lifted further, as soon as the respective connection experiences an adequate vertical force, that is to say that the respective loudspeaker box 2 has "taken the turn" as a result of the further lifting procedure.

In the example of a latching hook 25_2 as illustrated herein, the latching hook 25_2 at the moment of absorbing stress locks in a self-acting manner. As has been already explained, the securing bolt 27 may then moreover by pushed through the bore 25_3 in the latching part 25 in order for the latching connection to be secured.

In the case of this setting-up variant, the roller boards are successively removed as soon as the latter have been deprived of their function, that is to say as soon as the respective loudspeaker box 2 has "taken the turn" and the roller board has lost contact with the base surface thereof, for example.

After all of the loudspeaker boxes 2 have been suspended, the line array 1 that is illustrated in FIGS. 1 and 3A is further elevated and, upon reaching the desired height, is suspended from the fly frame 5 in a freely floating manner above the base surface.

Taking down the line array 1 in the case of the caterpillar method is performed in exactly the reverse manner to setting up. It may be provided, for example, that as long as a vertical tensile force is still acting on the respective latching connection, the latter is (not released but already) unlocked such that easy releasing of the latching connection is possible as soon as the latching connection is free of any force. In the case of the latching connection that is explained in an exemplary manner herein, unlocking of the latching connection may be performed by removing the securing bolt 27. In the course of the loudspeaker boxes 2 being further lowered, the loudspeaker boxes 2 fold together such that the latching connection (herein the latching hook 25_2, for example) is free of any force and may be released (herein by folding back the latching hook 25_2). Subsequently, the retaining elements (for example the locking bolts 26) that determine the respective intermediate angle may be removed.

Figure 4:
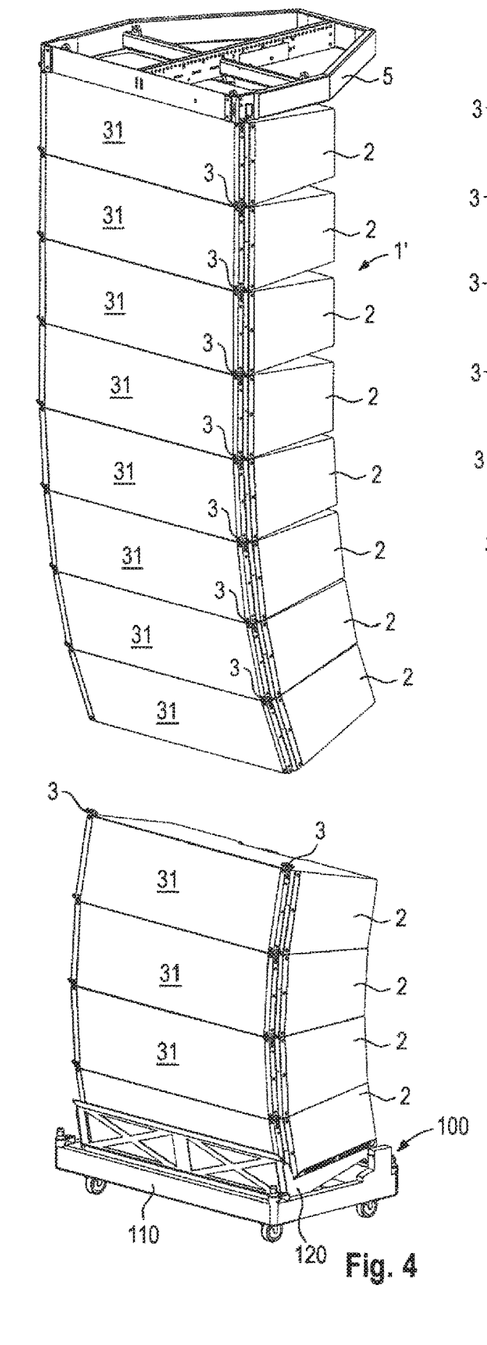
FIG. 4 is a perspective view of a partially completed line array and of a transport cart having a group of preassembled loudspeaker boxes.
Figure 5:
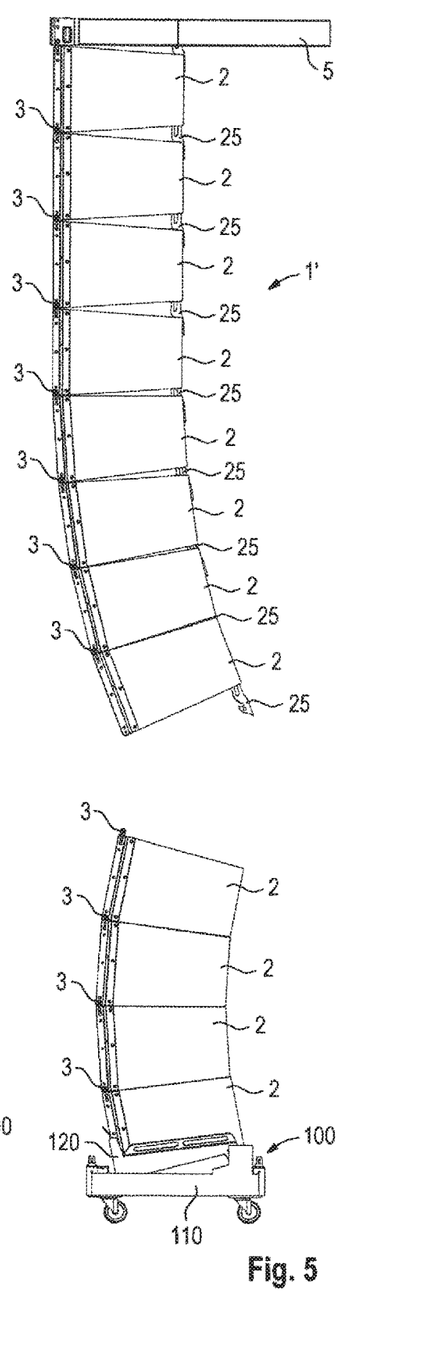
FIG. 5 is the arrangement illustrated in FIG. 4, in a side view.

A further setting-up and taking-down variant by way of which line arrays 1 may likewise be set up or taken down, respectively, by way of the tension method is illustrated in FIGS. 4 and 5. This method variant is also referred to as the transport-cart variant.

Tension Method—Setting-Up/Taking-Down Variant 2

In the case of the transport-cart variant, the loudspeaker boxes 2 are connected in groups (of, for example, 4 units, see FIGS. 4 and 5) at the frontages thereof by way of the articulated connections 3. This means that the loudspeaker boxes 2 at the frontages thereof are already preassembled. Otherwise, the loudspeaker boxes 2 lie on top of one another in a completely "collapsed" manner according to the trapezoidal angle of the former. This means that the connection (latching connection) on the rear side has not yet been activated at this point in time.

FIGS. 4 and 5 shows a transport cart 100 on which the groups of loudspeaker boxes 2 are transported to the respective fly frame 5, or to the already partially set-up line array 1'. The transport cart 100 has a chassis 110 and an inclination-adjustable bearing face 120. In this case, inclination adjustable means that the angle between the bearing face 120 and the chassis 110 is variably settable. To this end, the transport cart 100 has an inclination-adjustment mechanism (not illustrated) by way of which the inclination of the bearing face 120 in relation to the chassis 110 is presettable.

It can be seen in the example illustrated in FIGS. 4 and 5 that the inclination of the bearing face 120 may be set such that the center of gravity of the (collapsed) group of loudspeaker boxes 2 remains so as to be substantially central above the transport cart 100. This may be achieved, for example, in that the inclination of the bearing face 120 corresponds to approximately 1.5 times the trapezoidal angle of the housing of the loudspeaker boxes 2.

Setting up the line array 1 by way of the transport-cart method is performed in the following way. First, a fly frame 5 is assembled on the topmost loudspeaker box 2 of the first group of loudspeaker boxes 2.

In the next step, the desired intermediate angles α between the loudspeaker boxes 2 of the first group are preselected. This may be performed in the already described way by positioning the retaining element on the second assembly rail 20'. In order to avoid repetition, reference is made to the description above.

When the first group of loudspeaker boxes 2 are lifted, all of the latching connections between the loudspeaker boxes 2 of the first group successively interlock (e.g. snap-fit) into the respective locking positions thereof, wherein reference is again made to the description above for the details. On account thereof, each latching connection obtains the required length for the respective desired intermediate angle α. The latching connection may then be secured in the already described way, for example by inserting the securing bolts 27 into the respective bores 25_3 in the latching parts 25.

Thereafter, the first group of loudspeaker boxes 2 is lifted by means of the fly frame 5. A second transport cart 100 which is loaded with a second group of "collapsed" loudspeaker boxes 2 is driven below the partially set-up line array 1'. The partially set-up line array 1' is lowered so far that the articulated connection 3 on the front, between the lowermost loudspeaker box 2 of the already suspended first group of loudspeaker boxes 2 and the topmost loudspeaker box 2 of the stacked second group of loudspeaker boxes 2, may be established.

Subsequently, or already prior thereto, the desired intermediate angle α between the two mentioned loudspeaker boxes 2, and the desired intermediate angles α within the second group of loudspeaker boxes 2 are/were preselected. This may be performed in the already mentioned way by positioning the retaining elements on the second assembly rails 20'. Usually, the intermediate angles α in all groups of loudspeaker boxes 2 are preselected first, then the transport carts 100 having the prepared groups of loudspeaker boxes 2 are provided so as to correspond to the sequence thereof, and setting up the line array 1, by suspending the loudspeaker boxes 2 in a group-by-group manner, is performed only thereafter.

Subsequently, the latching connection between the lowermost loudspeaker box 2 of the first (suspended) group of loudspeaker boxes 2 and the topmost loudspeaker box 2 of the second (lower) group of loudspeaker boxes 2 has to be established. FIGS. 4 and 5 highlight the issue of this otherwise very efficient and time-saving setting-up method that exists herein: The already suspended array composite (for example a plurality of groups of loudspeaker boxes) under certain circumstances needs to be severely tilted in order for the configuration of a latching connection between the lowermost loudspeaker box 2 of the suspended array composite and the topmost loudspeaker box of the stacked second group of loudspeaker boxes 2 to be enabled in the first place. For example, if and when a latching hook 25_2 is used as a latching part 25, as in the example illustrated herein, this step corresponds to the latching hook 25_2 "catching" in the region of the second assembly rail 20'. This at some point (for example as the number of loudspeaker box groups that are suspended to the partially completed line array 1 increases) becomes difficult in the case of heavily curved and/or long line arrays 1.

Alternatively, it is possible that the group of loudspeaker boxes 2 that has just been suspended is lifted so as to be only fastened to the articulated connections on the front, and is subsequently manually pushed upward so as to enable interlocking of the latching part 25 of the lowermost loudspeaker box 2 on the partially completed line array 1' to the topmost loudspeaker box 2 of the suspended group. While this is possible in the case of small and light systems, it is not possible in the case of large and heavy loudspeaker boxes 2.

Taking down the line array 1 may likewise be performed in groups of loudspeaker boxes 2. The securing features of all latching parts 25 below the intended separation line are removed, and the line array 1 is lowered further. The line array 1 during further lowering is moved to a position that enables the lowermost group of loudspeaker boxes 2 to be placed onto the transport cart 100. This is relatively difficult in the case of severely curved and long line arrays 1, in particular when separating the first loudspeaker box groups from the line array 1.

Upon being lowered, the rear latching connections within the loudspeaker group collapse, and the latching connection at the separation point (that is to say between the topmost loudspeaker box of the loudspeaker-box group to be separated and the lowermost loudspeaker box of the partially disassembled line array 1') is completely released. The front articulated connection 3 is then released. The henceforth completely separated group of loudspeaker boxes 2 is removed by means of the transport cart 100. In a next step, the line array 1' in the same way is shortened by the next lower group of loudspeaker boxes 2.

In summary, it is to be stated that the tension method using transport carts works well in the case of relatively short and/or light line arrays 1, but is difficult to carry out in the case of long and/or heavy systems.

A fundamentally other setting-up/taking-down method for a line array 1 will be described hereunder by means of FIGS. 6 to 11. This method will also be referred to hereunder as the compression method. The substantial difference between the compression method and the tension method lies in that the curved shape of the line array 1 is generated only upon completion of the entire loudspeaker-box composite.

Figure 6:
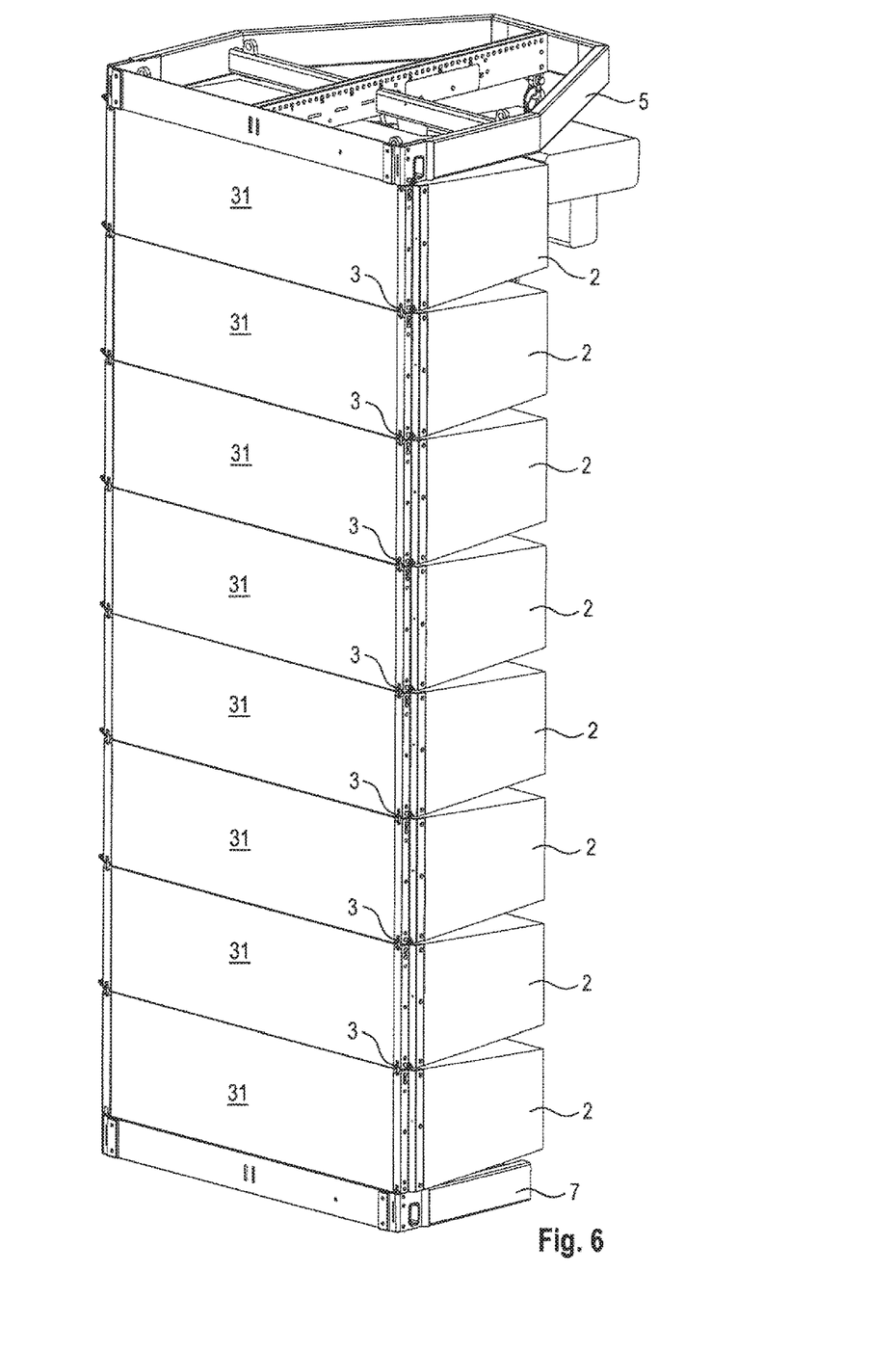
FIG. 6 is a perspective view of a suspended line array prior to compressing the line array to the final curved shape thereof.
Figures 7A, 7B, 7C:
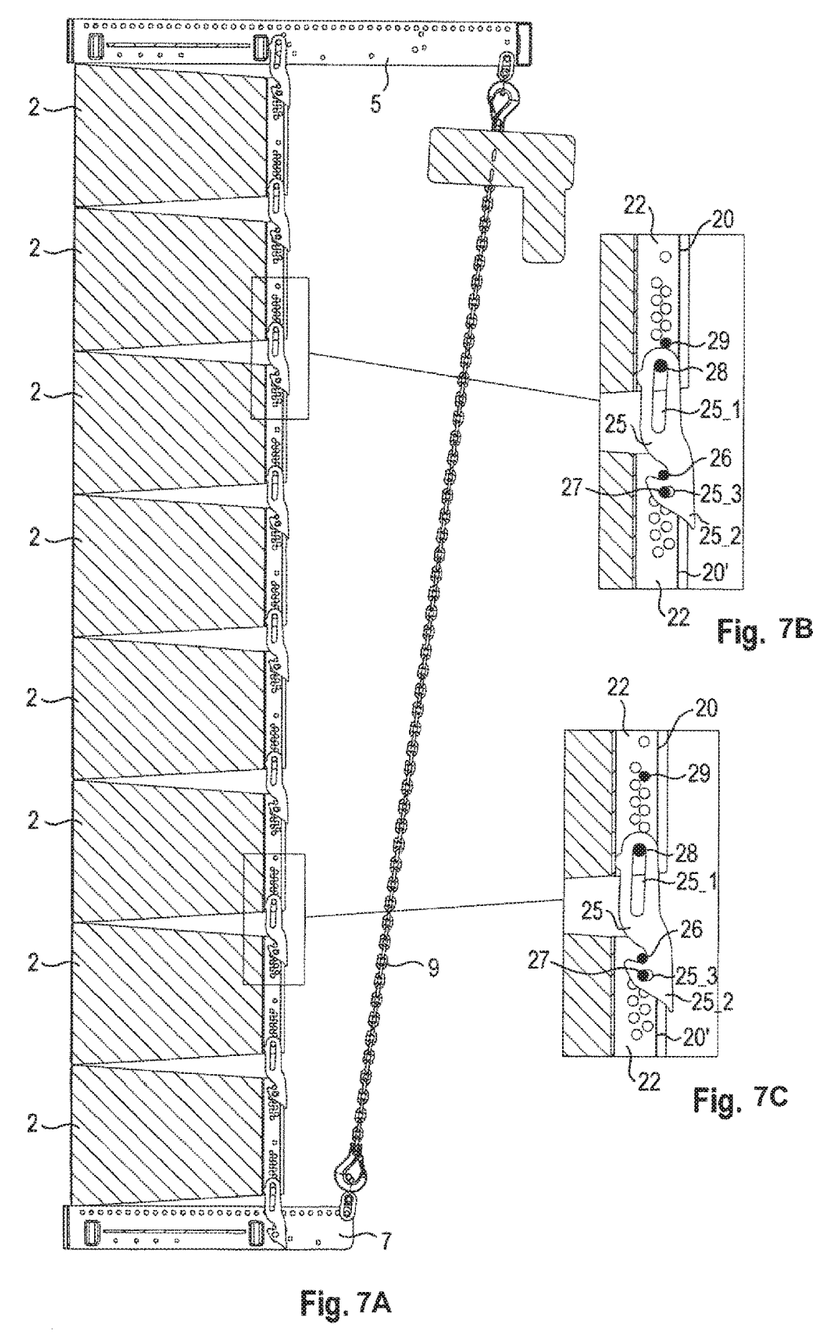
FIG. 7A is a cross-section illustration of the line array shown in FIG. 6.
FIG. 7B is a portion of FIG. 7A in the region of a connection device in the upper part of the line array.
FIG. 7C is a portion of FIG. 7A in the region of a connection device in the lower part of the line array.

FIGS. 6 and 7A show the complete line array 1, wherein the individual loudspeaker boxes 2 are however, initially aligned so as to still be linear, that is to say having parallel frontages.

FIGS. 7A, 7B, and 7C highlight the connection of adjacent loudspeaker boxes 2 in the region of the rear walls 39 thereof, as is used to this end. The latching part 25 is fixedly connected to the second assembly rail 20', and is connected so as to be longitudinally displaceable to the first assembly rail 20. The locationally fixed connection of the latching part 25 to the second assembly rail 20' may be accomplished, for example, in that the latching hook 25_2, if available, by way of the bore 25_3 in the latching part, and the securing bolt 27 are interconnected in a locationally fixed manner.

The position of the latching part 25 under stress by the assembly-rail bolt 28 which is inserted through the elongate bore 25_1 of the latching part 25 is determined on the first assembly rail 20. In other words, the latching part 25 is attached to the first assembly rail 20 in a longitudinally displaceable manner, wherein a maximum free path length of the longitudinal displaceability in relation to the first assembly rail 20 is determined by the length of the elongate bore 25_1. However, the longitudinal displaceability of the latching part 25 on the first assembly rail 20 that is enabled by the elongate bore 25_1 does not become effective under stress.

An (actual) free path length of the longitudinal displaceability of the latching part 25 may be settable by way of a stop, the position of which in relation to the first assembly rail 20 is preselectable. For example, the stop may be configured by a stop bolt 29 which is inserted in one of the pairs of bores of the first double-bore grid 23 in the profiled element 22 of the first assembly rail 20, for example. It becomes clear from FIGS. 7B and 7C that the stop in the elongated state of the loudspeaker-box composite does not have any function, that is to say either does not contact the latching part 25 at all (see FIG. 7C), or even if said stop were to be removed, at least would not modify the geometry of the line array 1 that at this point in time is still elongated.

A traction frame 7 which on the rear side thereof by way of a compression hoist (for example a motorized chain hoist, a grip hoist, or any other supporting strand) may be pulled upward is attached to the lowermost loudspeaker box 2 of the line array 1. The compression hoist 9 may be operated from the support base, that is to say that upon completion of the composite of loudspeaker boxes 2, the line array 1 may be compressed by shortening the compression hoist 9 and, on account thereof, be bent to the final shape thereof.

Figure 8A:
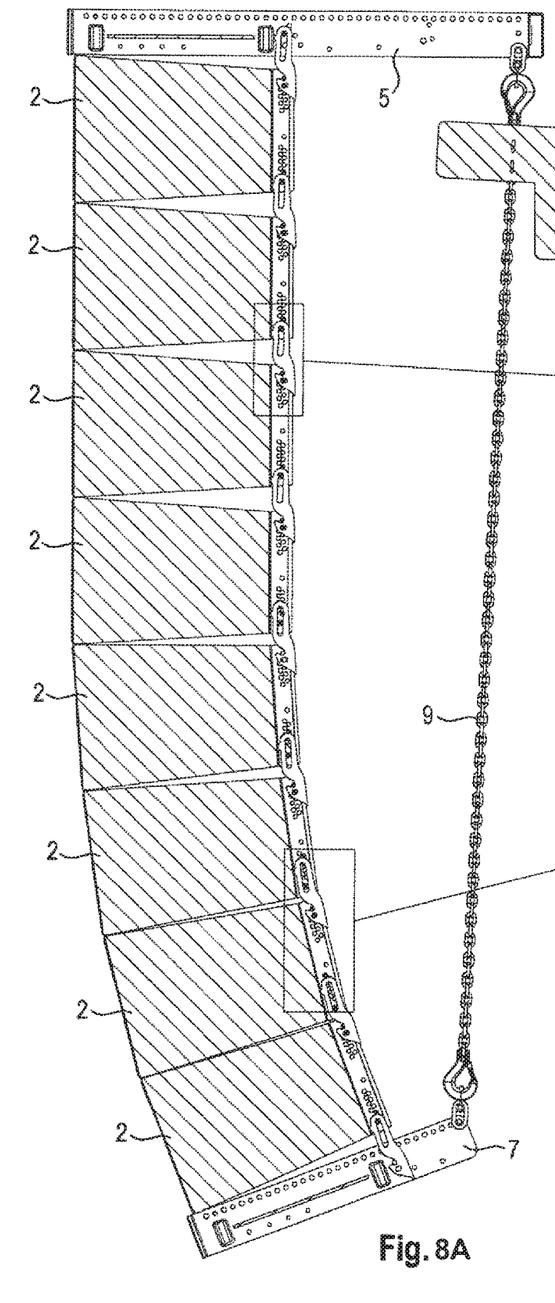
FIG. 8A is a cross-sectional illustration of the line array as shown in FIG. 7A, upon compression of the line array by way of a compression hoist that runs on the rear side of the line array.
Figure 8B:
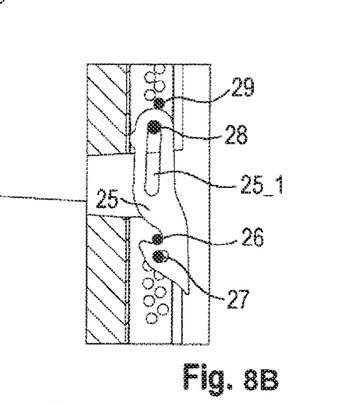
FIG. 8B is a portion of FIG. 8A in the region of a connection device in the upper part of the line array.
Figure 8C:
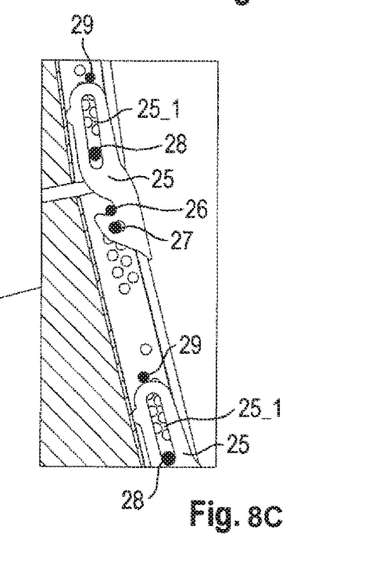
FIG. 8C is a portion of FIG. 8A in the region of a connection device in the lower part of the line array.

Compressing the line array 1 by shortening the compression hoist 9 (which extends between the traction frame 7 and the fly frame 5, for example) is illustrated in FIGS. 8A, 8B, and 8C. By shortening the compression hoist 9, the latching parts 25 slide on the first assembly rail 20, in a manner corresponding to the free path length of the longitudinal displaceability of said latching parts 25 that is preselected by the stops (for example the stop bolts 29).

The free path length of the longitudinal displaceability in the upper region of the line array 1 may be very minor or be zero (see FIG. 8B). A larger free path length of the longitudinal displaceability is enabled in the lower region of the line array 1, in which the latter is typically more severely bent, by means of a corresponding pre-positioning of the stops (e.g. stop bolts 29), such that in said lower region two adjacent loudspeaker boxes 2 in the region of the rear walls 39 thereof may be moved closer together. As soon as all of the latching parts 25 have impacted on the stops (stop bolts 29) thereof, the respective target angles (intermediate angles α) between the adjacent loudspeaker boxes 2 are set, and the desired final shape of the line array 1 is thus achieved.

Figure 9:
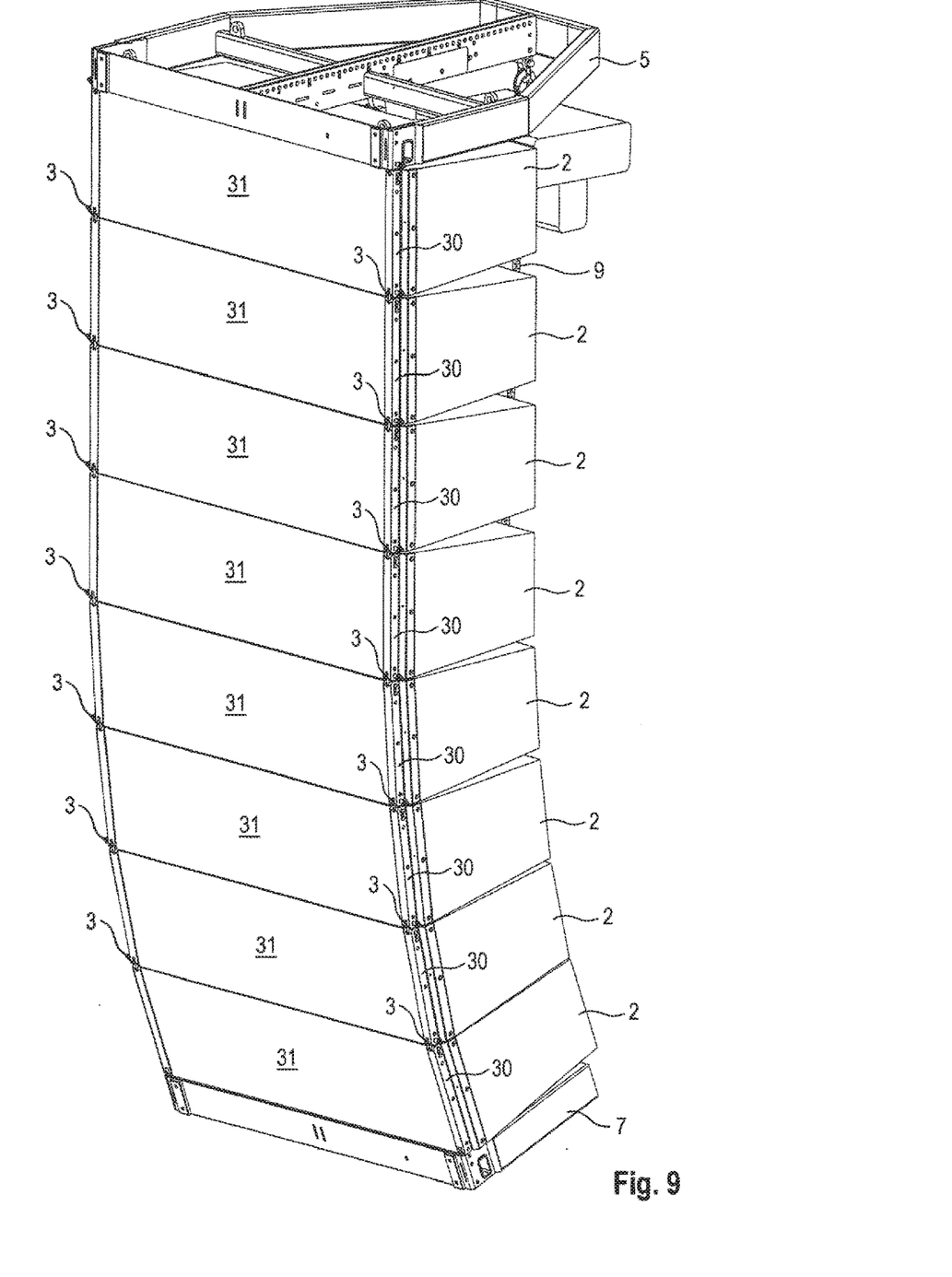
FIG. 9 is a perspective view of the line array as shown in FIG. 8A, after compression.

FIG. 9 shows the compressed line array 1 in the final curved shaping thereof.

Figure 10:
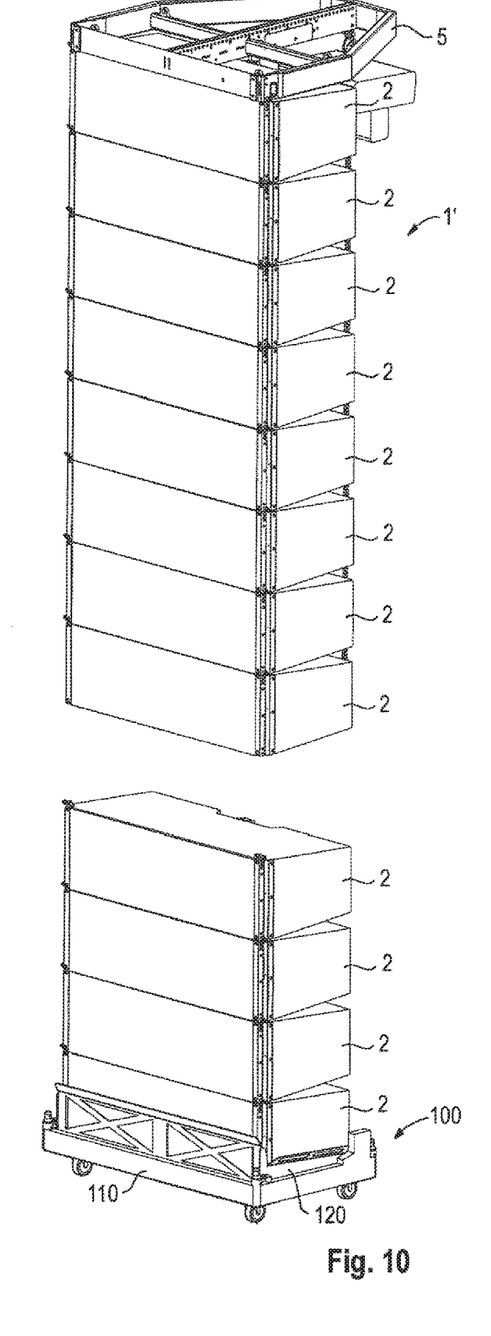
FIG. 10 is a perspective view of a partially completed line array and of a transport cart having a preassembled group of loudspeaker boxes.
Figure 11:
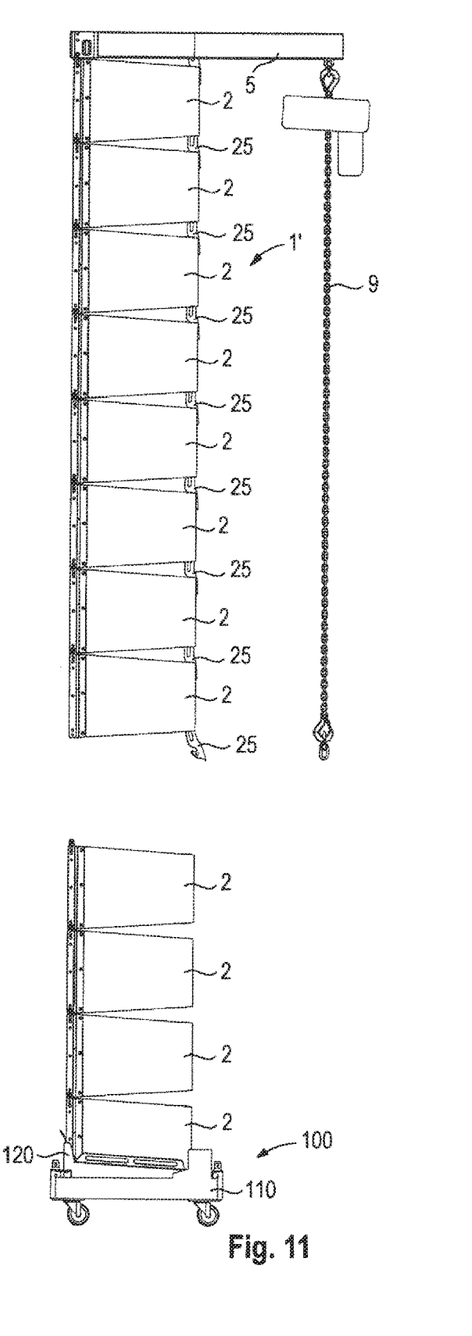
FIG. 11 is the arrangement as shown in FIG. 10, in a side view.

FIGS. 10 and 11 highlight setting-up and taking-down, respectively, the line array 1, according to the compression method.

Compression Method with a Transport Cart

In the case of the compression method with a transport cart, the loudspeaker boxes 2 are likewise transported in groups (for example 4 units) having connected frontages, lying on the bearing face 120 of the transport cart 100, to the fly frame 5.

The loudspeaker boxes 2 of the group of loudspeaker boxes 2 herein are fixed in a linear alignment, see FIGS. 10 and 11. The linear alignment (that is to say having parallel loudspeaker frontages), is accomplished by blocking the longitudinal displaceability of the latching part 25 on the first assembly rail 20. Blocking the longitudinal displaceability is performed by the stop (for example the stop bolt 29), for example, which reduces the free path length of the longitudinal displaceability of the latching part, or may even set said path length to zero. This means that in the case of the exemplary embodiment shown herein, it may be achieved by suitable insertion of the stop bolt 29 into a transportation position according to FIG. 7B that the loudspeaker boxes 2 of the group of loudspeaker boxes 2 in the upright (that is to say not yet suspended) state do not collapse but remain so as to be stacked on top of one another in a vertical manner.

Thereafter, the fly frame 5 is assembled on the upper loudspeaker box 2 of the first group of loudspeaker boxes 2 that is located on the transport cart 100. As has already been mentioned, a compression hoist 9 is additionally attached in the rear region of the fly frame 5 here. Thereafter, the fly frame 5 having the first group of loudspeaker boxes 2 assembled thereon is lifted. A desired target angle may be preselected as soon as the force in the rear connection (latching part 25 and retaining element, for example the locking bolt 26) on the second assembly rail 20' changes from compression to traction during lifting. The target angle between adjacent loudspeaker boxes 2 may, for example, be preselected in that the stop which in the stacked/upright loudspeaker-box group still caused the vertical alignment of the loudspeaker boxes 2 is now repositioned such that said stop predefines the target angle. In the example illustrated in FIG. 8A this means that the stop bolt 29 in FIG. 8B may remain unchanged (since the line array 1 in the upper region is to run in a rectilinear manner), while the stop bolt 29 in the case of loudspeaker boxes 2 that are located in the lower region of the line array 1 is repositioned from the transportation position (FIG. 8B) to a target-angle predefining position (FIG. 8C).

The array composite is then lifted and remains suspended in a rectilinear manner without any curvature, as is shown in FIG. 7A.

Thereafter, a second transport cart 100 is driven below the partially set-up line array 1', and the latter is lowered so far that all connections (front articulated connection 3 and rear latching connection by means of the latching part 25 and the retaining element) may be established. To this end, no tilting of the already suspended loudspeaker boxes 2 is required, since all of the loudspeaker boxes 2 (both those of the partially set-up line array 1', as well as those loudspeaker boxes 2 that are stacked on the transport cart 100) are aligned in a rectilinear or vertical manner, respectively.

After the second group of loudspeaker boxes 2 has been lifted, the desired target angles between the adjacent loudspeaker boxes 2 are again preselected.

If and when all of the loudspeaker boxes 2 of the line array 1 have been suspended in this way, the compression hoist 9 by way of a suitable receptacle element (for example the traction frame 7) is fastened to the lower end of the line array 1 and is shortened, for example by motive power and remote control from the base surface. As a result, all of the preselected target angles are set as intermediate angles α, see FIGS. 8A, 8B, 8C, and 9.

Taking down the line array 1 according to the compression method is again performed in a manner that is substantially the reverse of setting up. First, the compression hoist 9 between the fly frame 5 and the traction frame 7 (or another fastening on the lowermost box of the line array 1) is relaxed. All connections on the rear side expand back to the maximum lengths thereof. The line array 1 is suspended in a straight manner (see FIG. 7A), and may be disassembled and stored on the transport carts 100 and conveyed away loudspeaker box group by loudspeaker box group in the reverse order as is explained by means of FIGS. 10 and 11.

The compression method generally works equally both for short and/or light, as well as for long and/or heavy line arrays 1. The compression method may moreover also be carried out with the loudspeaker boxes 2 being individually suspended.

Embodiments of the invention described herein enable both setting-up methods (tension method and compression method), using one and the same connection device. This is achieved substantially in that a latching connection (which is not required in the case of the compression method) is combined with a longitudinal displaceability of the latching part 25 that by way of a stop is variably preselectable (longitudinal displaceability of the latching part 25 is not required in the case of the tension method). This even enables that both setting-up methods may be applied within one line array 1. For example, it is possible that a line array 1 is initially set up using the tension method and, as soon as the latter becomes problematic by virtue of the increasing curvature of the line array 1, a changeover is made to the compression method. Or it is possible that the compression method having a linear box arrangement is initially employed for setting up the line array 1, and that the lowermost loudspeaker boxes 2 are attached using the tension method.

In the same way, the transport cart 100 according to the invention is employable for both setting-up methods. This is enabled by the inclination-adjustability of the bearing face 120. The inclination-adjustability of the bearing face 120 may be caused by an inclination-adjustment mechanism and be provided in discrete steps.

In the case of the compression method, the inclination of the bearing face 120 in relation to the horizontal (i.e. for example the chassis 110) is set depending on the trapezoidal angle of the housing of the loudspeaker boxes 2, so as to achieve a vertical loudspeaker-box stack. For this purpose, the inclination of the bearing face 120 of the transport cart 100 may be set to 0.5 times the trapezoidal angle of the housing of the loudspeaker boxes 2, for example. By contrast, an inclination of the bearing face 120 of the transport cart 100 of approximately 1.5 times the trapezoidal angle of the housing of the loudspeaker boxes 2 is set in the case of the tension method, for example (in the case of e.g. 4 loudspeaker boxes 2).

The inclination-adjustment mechanism by way of which the inclination of the bearing face 120 is presettable may be embodied in many various ways. For example, the inclination-adjustment mechanism may comprise a shaft having an eccentric that engages below the bearing face 120 and, depending on the rotational position of the shaft, caused the desired inclination of the bearing face 120 according to the desired inclination step, for example. The inclination-adjustment mechanism may be manually operable in a simple manner, since the inclination adjustment in principle is only required in the unloaded state of the transport cart 100. However, it may also be provided that a more complex inclination-adjustment mechanism (a hydraulic mechanism, for example) may be employed, so as to additionally enable tilting of the loudspeaker-box group, or a correction of the preset inclination, respectively, also in the loaded state.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A connection device for setting up an arrangement of a plurality of loudspeaker boxes that are suspended beneath one another, comprising:
a first assembly rail configured for assembly on a first loudspeaker box of the plurality of loudspeaker boxes and to which a latching part is attached; and
a second assembly rail configured for assembly on a second loudspeaker box of the plurality of loudspeaker boxes and to which a retaining element that interacts with the latching part is attached, wherein:
a free path length of a longitudinal displaceability of the latching part in relation to the first assembly rail is preselectable, and
a position of the retaining element in relation to the second assembly rail is preselectable, wherein the latching part on an end that faces the second assembly rail has a latching hook.

2. The connection device of claim 1, wherein the connection device is configured such that when the first assembly rail and the second assembly rail are assembled in a locationally fixed manner on the first loudspeaker box and the second loudspeaker box, respectively, the first loudspeaker box and the second loudspeaker box, by preselection of the position of the retaining element, or by preselection of the free path length of the longitudinal displaceability, are interlockable at a preadjustable angle.

3. The connection device of claim 1, wherein the first loudspeaker box is configured for disposal above the second loudspeaker box.

4. The connection device of claim 1, wherein:
the latching part has an elongated bore through which an assembly-rail bolt that is fixable to the first assembly rail protrudes, or
the first assembly rail has an elongated bore through which a latching part bolt that is fastened to the latching part protrudes.

5. The connection device of claim 1, wherein the latching part is fastened to the first assembly rail by means of a pivot joint.

6. The connection device of claim 1, wherein:
the free path length of the longitudinal displaceability of the latching part is settable by way of a stop, and
a position of the stop in relation to the first assembly rail being preselectable.

7. The connection device of claim 6, wherein the free path length of the longitudinal displaceability of the latching part is preselectable to a value of substantially zero by way of a special selection of the position of the stop.

8. An arrangement of a plurality of loudspeaker boxes that are suspended beneath one another, the arrangement comprising at least two loudspeaker boxes that are disposed beneath one another and that in a front region are interconnected by way of an articulated connection and that on a rear side are connected by way of at least one connection device of claim 1.

9. The arrangement of claim 8, wherein the connection device is configured so as to predefine an angle of the two loudspeaker boxes that are disposed beneath one another in a suspended state by preselection of the position of the retaining element in relation to the second assembly rail.

10. The arrangement of claim 8, wherein the connection device is configured so as to predefine an angle of the two loudspeaker boxes that are disposed beneath one another in a suspended state by preselection of the free path length in relation to the first assembly rail.

11. A method for setting up an arrangement of claim 9, the method comprising:
preassembling a first group of loudspeaker boxes, having the first loudspeaker box as a topmost loudspeaker box and the second loudspeaker box as a loudspeaker box that lies therebelow, by connecting the first loudspeaker box and the second loudspeaker box at the articulated connections, wherein the first loudspeaker box and the second loudspeaker box bear on one another without an intermediate angle;
preselecting the position of the retaining element on the second loudspeaker box in relation to the second assembly rail;
suspending the first loudspeaker box to a fly frame or to a lowermost loudspeaker box of a partially set-up arrangement; and
lifting the first group of loudspeaker boxes, wherein an intermediate angle that is predefined by the position of the retaining element is established between the first loudspeaker and the second loudspeaker box.

12. The method of claim 11, the method comprising:
securing the intermediate angle that is predefined by the position of the retaining element by mechanically fixing the latching part to the second assembly rail.

13. The method of claim 12, the method comprising:
upon lifting the first group of loudspeaker boxes, suspending a second group of loudspeaker boxes to the lowermost loudspeaker box of the first group of loudspeaker boxes.

14. The method of claim 11, the method comprising:
upon lifting the first group of loudspeaker boxes, suspending a second group of loudspeaker boxes to the lowermost loudspeaker box of the first group of loudspeaker boxes.

15. A method for setting up an arrangement of claim 10, the method comprising:
preassembling a first group of loudspeaker boxes, having the first loudspeaker box as a topmost loudspeaker box and the second loudspeaker box as a loudspeaker box that lies therebelow, by connecting the first loudspeaker box and the second loudspeaker box at the articulated connections, wherein an intermediate angle of zero between the first loudspeaker box and the second loudspeaker box is preselected by way of a stop of the latching part on the first assembly rail;
suspending the first loudspeaker box to a fly frame or to a lowermost loudspeaker box of a partially set-up arrangement;
repositioning the stop in relation to the first assembly rail;
lifting the first group of loudspeaker boxes, wherein an intermediate angle that is predefined by a new position of the stop is set between the first loudspeaker box and the second loudspeaker box; and
compressing the first group of loudspeaker boxes.

16. The method of claim 15, wherein compressing the first group of loudspeaker boxes is performed by way of a compression hoist that runs on the rear side of the arrangement.

* * * * *